United States Patent [19]

Skala

[11] 4,429,316

[45] Jan. 31, 1984

[54] ORIFICE BAND INK JET PRINTER WITH INK CONFINED BY A COUNTERPRESSURE OF AIR

[76] Inventor: Stephen F. Skala, 3839 S. Wenonah, Berwyn, Ill. 60402

[21] Appl. No.: 353,640

[22] Filed: Mar. 1, 1982

[51] Int. Cl.$^3$ .......................... G01D 15/18; G01D 9/00

[52] U.S. Cl. .......................................... 346/75; 346/1.1

[58] Field of Search ........................... 346/1.1, 75, 140

[56] References Cited

U.S. PATENT DOCUMENTS

| | | | |
|---|---|---|---|
| 3,971,040 | 7/1976 | Skala | 346/1.1 |
| 3,972,053 | 7/1976 | Skala | 346/1.1 |
| 4,064,513 | 12/1977 | Skala | 346/75 |
| 4,117,518 | 9/1978 | Skala | 346/140 IJ X |

*Primary Examiner*—Donald A. Griffin

*Attorney, Agent, or Firm*—Stephen F. Skala

[57] ABSTRACT

In an orifice band ink jet printer, an endless band having orifices therethrough moves in a separation between an air bearing and a source of liquid ink under high pressure which flows through the orifices to form jets. The ink also leaks from a gap between the orifice band and the source of ink with undesirable effects.

The invention confines the ink by a counterpressure of air at substantially the same pressure as the ink. In one embodiment, two adjacent air channels surround the gap. A first air channel adjacent to the gap contains air at a slightly lower pressure than the ink to preclude entry of air into the ink, but some ink may lead from the gap. A second air channel adjacent to the first contains air at a slightly higher pressure than the ink to confine the ink which may have leaked from the gap.

11 Claims, 3 Drawing Figures

ORIFICE BAND INK JET PRINTER WITH INK CONFINED BY A COUNTERPRESSURE OF AIR

BACKGROUND

This invention relates to ink jet printing and particularly to preventing leakage of ink from a gap between a traversing orifice band and an ink source.

The invention is embodied in an orifice band ink jet printer wherein the orifice band moves at a constant speed through a stationary source of liquid ink under pressure to sweep modulated columns of ink drops across an advancing sheet of ordinary paper. Ink jets emerging from orifices in the orifice band project between a row of signal responsive charging electrodes where the jets break into drops of uniform size. Drops forming between charging electrodes having a voltage applied thereto retain a charge and are deflected by a constant electrostatic field into an elongated collector for reuse. Drops forming between charging electrodes at a null voltage are uncharged and travel undeflected to deposit on paper as dots of ink. Basic ink jet printers wherein uniform drops forming from a jet are selectively charged for deflection by a constant electrostatic field are described in the following publications:

Sweet, R. G., "High Frequency Oscillography with Electrostatically Deflected Ink Jets", AD 437,951, National Technical Information Service 1964, and "I.B.M. Journal of Research and Development", Vol. 21, No. 1, pages 1-96, January 1977.

A linear array of orifices in a thin plate to form periodically disturbed jets is described for stationary orifices by Cha et al. in U.S. Pat. No. 4,138,689.

Basic features of the orifice band printer are disclosed by the applicant in U.S. Pat. Nos. 3,971,040, 3,972,053, and 4,117,518.

A general feature of orifice band ink jet printers is a desirable distribution of motions consisting of a high frequency modulation of the ink drops, a rapid and constant linear motion of the orifice band, and an unrolling at a moderate speed of paper into a flat configuration for convenient printing, cutting, and assembly into a package comprising a plurality of pages. General features of the traversing orifice band over stationary orifice plates include: reduction of aerodynamic distortions which may occur as drops travel through wakes of preceeding drops; a reduction of standing waves and induced noise on the orifices due to an absence of mechanical contact with the orifice band; and, feasibility of larger charging electrodes which operate on a moderate number of orifices for improved reliability. Features of a traversing orifice band printer having particular application for facsimile publishing include: deposition of uncharged drops for reduced electrostatic distortion; a uniform and closely spaced dot interval with overlap capability to saturate dark areas; and, use of the same orifice band for simultaneous printing of both sides of the paper.

A separation between the orifice band and the stationary ink source provides the advantages just cited but it also results in a leakage of ink through the separation gap. The cited U.S. Pat. No. 3,971,010 describes an orifice band printer wherein the ink which has leaked from the gap and air which has leaked from the air bearing are collected and the ink is reused. The air bearing also functions as an ink seal with air compressed therein preventing entry of the ink so that the ink does not escape beyond its removal channel and port. But the pumping of large amounts of ink through the gap and its conditioning to remove dissolved air is complex and energy inefficient. Further, the air bearing assembly could be made less complex if its function as an ink seal was not required.

It is an object of the invention to substantially stop flow of ink through the separation gap between the orifice band and stationary surface of the ink source assembly.

SUMMARY

These and other objects and advantages which will become apparent are attained by the invention wherein a liquid under pressure in a gap is surrounded by a gas under a regulated pressure to reduce its flow from the gap. An ink jet printer includes an ink jet forming assembly wherein an endless orifice band traverses a stationary ink source assembly. The orifice band is constrained to move in a path between the air bearing and a surface of the ink source assembly. The separation between the orifice band and the ink source surface is the gap through which the ink can flow. The ink is pumped into an elongated central ink channel in the ink source assembly at a pressure which is predetermined for proper ink jet characteristics. The ink flows from the central ink channel outward through the gap toward elongated air channels in the ink source assembly. Air in the air channels is regulated to be maintained at a pressure which is substantially the same as the pressure of the ink so that the net pressure of ink across the gap is almost null. Small pressure differences may be used to advantage. A slight positive pressure of the ink would assure that air does not enter the orifices yet would result in only a slight leakage from the gap. This small leakage can be confined to the ink source assembly by a pair of second air channels which are maintained at a higher air pressure than the first air channels so that air with any ink which may have leaked from the gap flows into the first air channels. This direction of air flow and capillary forces in the gap further tend to confine ink in the gap. The second air channels assure positive confinement of ink within the ink source assembly and enable an air bearing to be used on only one side of the orifice band. The principal forces acting upon the orifice band comprise a constant force of ink and air from the ink source assembly and an opposing spring type force from the air bearing, the forces being in balance at the equilibrium path of the orifice band.

Figure 1:
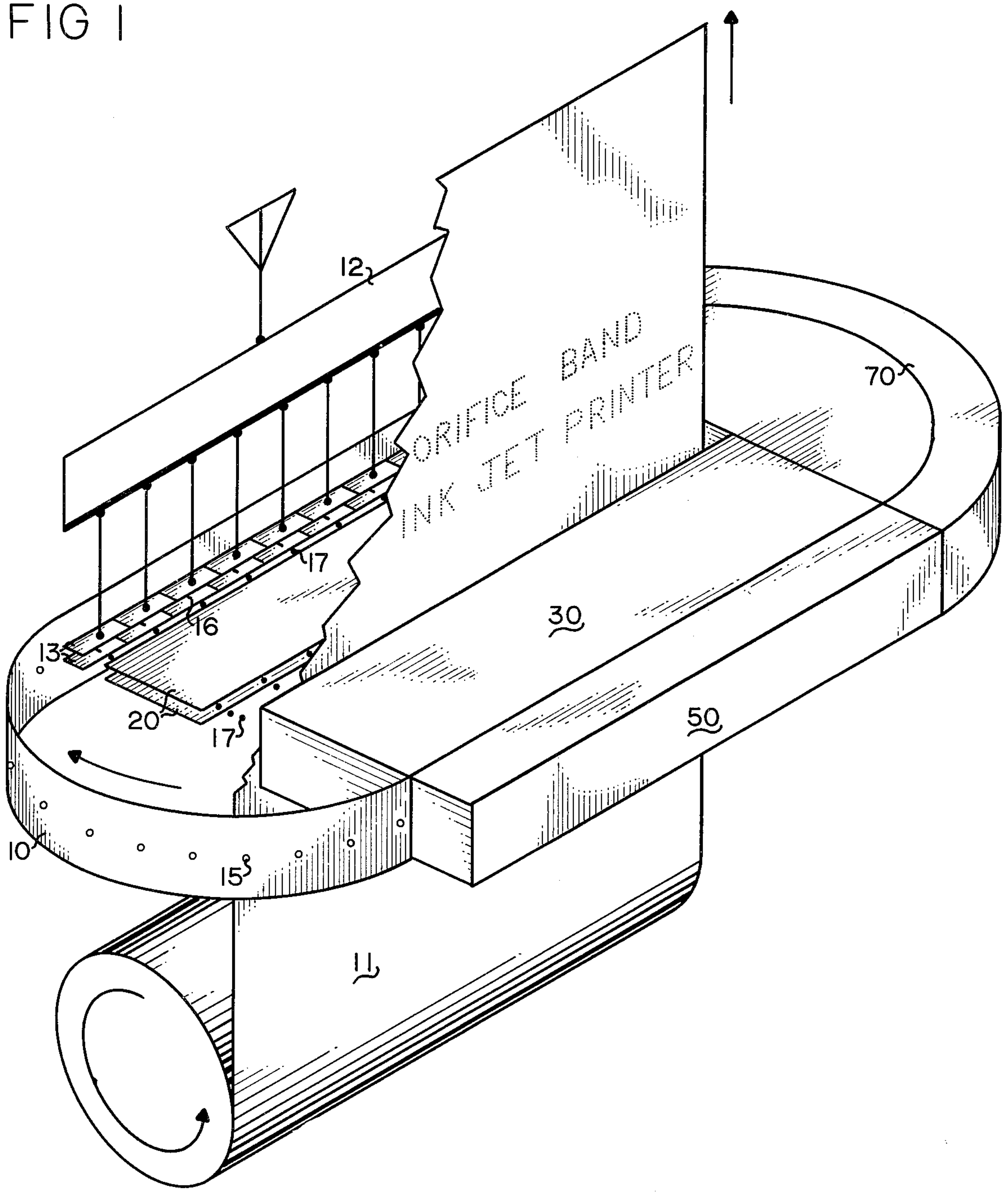
FIG. 1 is a pictorial view of an orifice band ink jet printer showing schematically components which are described in the cited patents and showing diagrammatically ink source assemblies which will be described with reference to the following drawings.

In an elementary representation of an orifice band ink jet printer illustrated by FIG. 1, an endless orifice band 10 sweeps modulated columns of ink drops horizontally as paper 11 advances vertically within the orifice band to synthesize an image as lines of dots on both sides of the paper. A receiver 12 transforms a digital signal into corresponding null or positive voltages for transfer to charging electrodes such as 13. A liquid ink emerging under pressure from a plurality of orifices such as 15 forms jets such as 16 which are capacitively coupled to the charging electrodes 13 whereby a voltage thereon induces a proportional electrical charge on the jets. The jets are periodically disturbed by acoustic or other means not shown to induce synchronous separation into uniform drops 17 which retain the electrical charge of the jet at the time of separation. Drops having a negative charge are deflected by a constant electrostatic field between deflecting electrodes 20 into a collector not shown for reuse. Uncharged drops travel undeflected onto the paper.

An air bearing and electrode assembly 30 includes the charging electrodes 13 and deflecting electrodes 20 which are described in the cited U.S. Pat. Nos. 3,971,040 and 3,972,053 and air bearings which are described herein with reference to FIG. 3. An ink source assembly 50 includes the ink under pressure, means for periodically disturbing the ink jets, means for maintaining vertical alignment of the orifice band, and means for confining ink in the gap according to the invention which are described herein with reference to FIG. 3.

Figure 2:
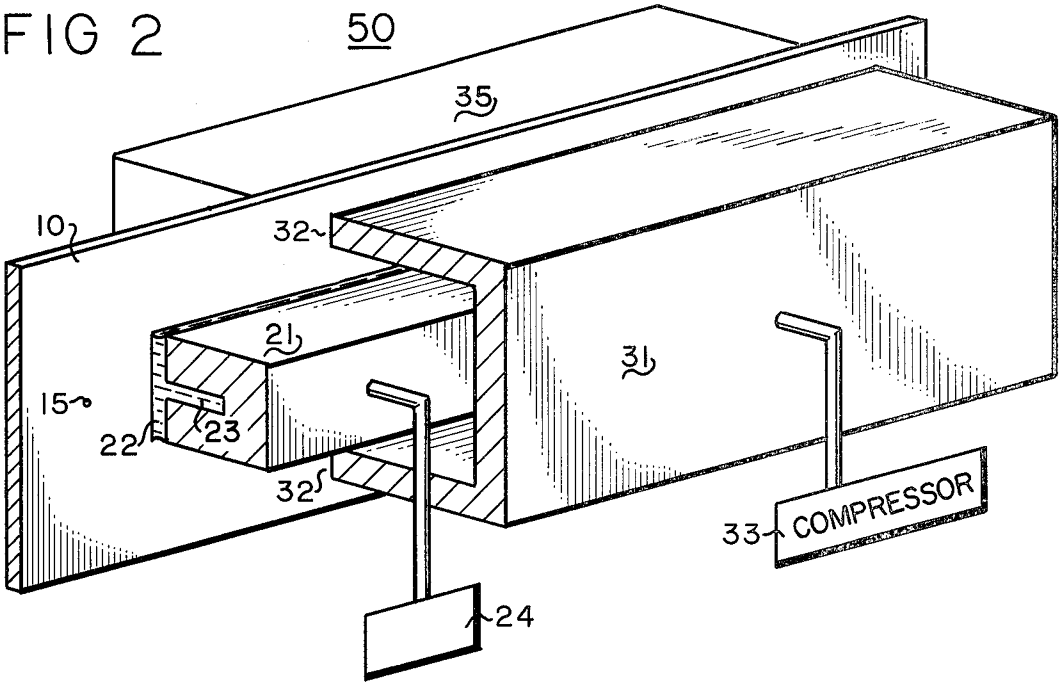
FIG. 2 is a pictorial drawing partly in section showing an elementary embodiment of an ink source assembly wherein flow of liquid ink through a gap is reduced by a counterpressure of air according to the invention.

FIG. 2 illustrates an elementary embodiment of an ink source assembly 50 wherein liquid ink is confined within a gap by a counterpressure of a gas. A surface of orifice band 10 is separated from a surface of the ink source 21 by a gap 22 into which ink 23 is forced by a pump 24 comunicating therewith. The pump 24 is regulated to maintain a pressure which is predetermined for proper operation of ink jets emerging from orifices such as 15. An enclosure 31, which partly surrounds the outer portion of the gap, is separated from the orifice band by a separation 32. A compressor 33 communicates with the enclosure to deliver an expendable gas such as air under pressure into the enclosure whereby the pressure differential across the gap is reduced to reduce flow of the ink therefrom. When the ink and the gas are at the same pressure, the ink is effectively confined to the gap.

Facing surfaces of an air bearing 35 on one side and of the ink source 21 and the enclosure 31 on the opposing side are maintained at a constant and uniform separation by rigid connections therebetween, not shown. The orifice band 10 is constrained to traverse a path between and separate from the air bearing 35 surface and the facing surfaces of the ink source 21 and the enclosure 31 by the air bearing which exerts a restoring force having a large change over a small distance whereby gaps on each side of the orifice band remain substantially constant. The gaps are sufficient to accommodate manufacturing and operating variations but otherwise are minimized. The gap 22 between the orifice band and the ink source is small to preclude turbulance in the ink which could cause undesirable random trajectories and nonuniform ink drops. The gap 32 between the orifice band and the enclosure is small to reduce loss of the air compressed therein. The orifice band ink jet printer has a racetrack configuration wherein the linear portions operate to project ink drops onto paper advancing therebetween. At these linear portions, the orifice band 10, the air bearing 35, the ink source 21, and the enclosure 31 all have planar surfaces which are mutually parallel.

Figure 3:
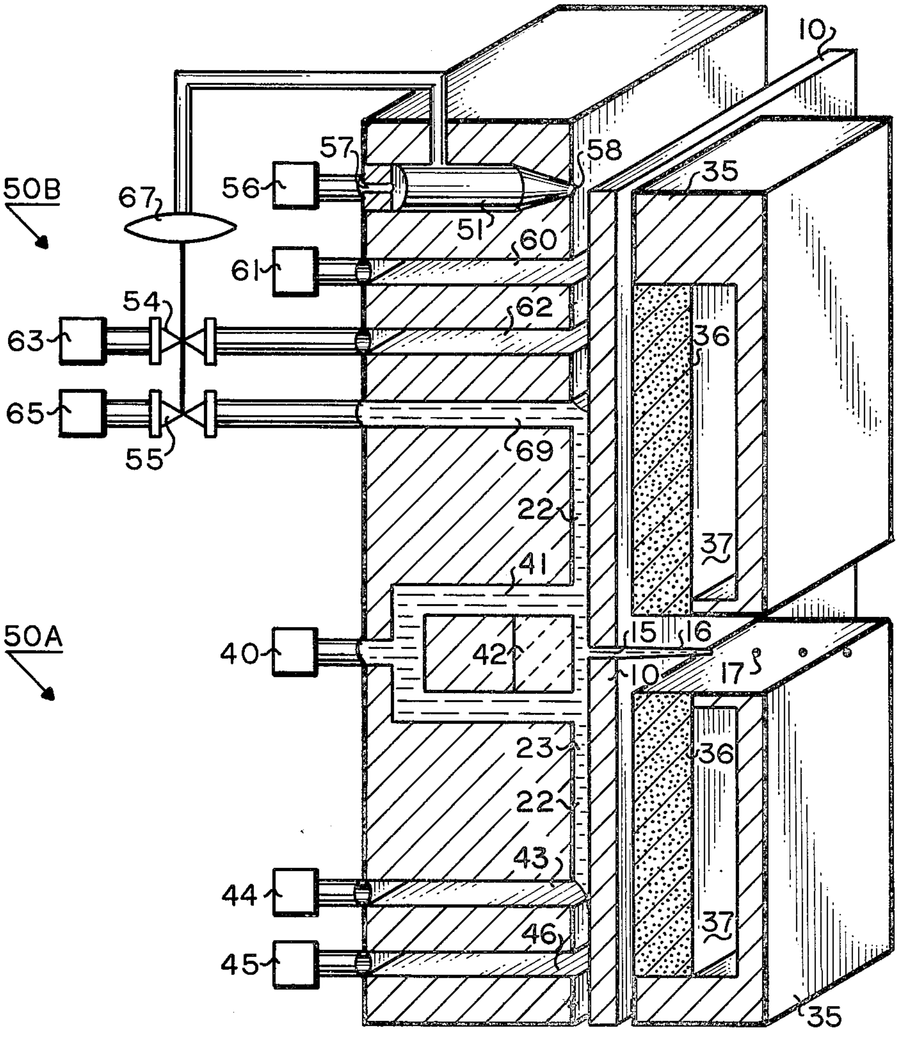
FIG. 3 is a schematic sectional view across an ink source assembly, an orifice band, and a portion of an air bearing assembly showing control of ink flow through a gap both to provide a minimal flow according to the invention and to stabilize position of the orifice band by inducing a regulated vertical force thereon.

In FIG. 3, a counterpressure of a gas confines liquid ink to portions of a gap between a surface of an ink source assembly 50 and a surface of orifice band 10. The lower portion 50A of the ink source assembly has two air channels which confine the ink. The upper portion 50B of the ink source assembly also has two air channels to confine the ink and has an additional channel to regulate flow of ink through the gap to exert a force on the orifice band for alignment thereof.

The ink source assembly 50 and air bearings 35 are rigidly connected by means not shown to maintain between opposing surfaces thereof a uniform separation. Within the separation, the orifice band moves without contact and is effectively constrained to a path by forces which include an outward force of the air bearing which decreases with displacement, an opposing inward force of the ink which does not vary with displacement, and tensile stress of the orifice band. The net force is restoring and the path of the orifice band is a position of stable equilibrium.

Ink reservoir 40, constituting a source of ink at a pressure predetermined for optimal ink jet performance, communicates with ink source channel 41 and orifices 15 to deliver the ink thereto. The ink emerges from the orifices as a jet 16 which is periodically disturbed by piezoelectric transducer 42 to form uniform drops 17. The ink also flows into gap 22 between the orifice band and a surface of the ink source assembly. Two adjacent channels 43 and 46 maintain a gas, such as air, at pressures which are predetermined to be substantially the same as the ink pressure, but varying slightly therefrom by amounts sufficient to preclude both entry of air into the orifices and leakage of ink from the ink source assembly 50. Air pressure in the first air channel 43, which is adjacent to the gap 22, is regulated by a regulator valve in the ink separating assembly 44. The regulator valve, not shown, responds conventionally to pressure information from the ink reservoir 40 to maintain air pressure at the slight predetermined decrease from the ink pressure. Air pressure from compressed air source 45 also is regulated in response to ink pressure information from the ink reservoir 40 to maintain a slight increase over the ink pressure. The compressed air source 45 communicates with second air channel 46, which is adjacent to and outward from the first air channel 43. The air at the increased pressure in the second air channel 46 flows inward into the first air channel 43 to that any ink which may have leaked from the gap 22 flows with air into the ink separating assembly 44. The ink is prevented from flowing outward beyond the first air channel 43 by the pressure and flow of air from the second air channel 46. A substantial portion of the air from the second air channel escapes, but the air is an expendable gas which does not contaminate the printer.

The orifice band 10 traverses a path having the general form of a racetrack with linear portions having the functions of projecting modulated columns of ink drops toward paper advancing between the linear portions. The lower portion 50A of the ink source assembly is representative of the linear portion where the orifice band surfaces and facing surfaces of the air bearing 35 and the ink source assembly 50 have a planar shape and a coplanar configuration. The upper portion 50B of the ink source assembly may be located at the linear portion or it may be located at the curved portion of the path. The curved portion may also include means for driving the orifice band and for synchronizing its speed and position with signals. The curved portion also includes the air channels for confining the ink.

In the upper portion 50B of the ink source assembly 50, the invention has the more particular attribute of varying the counterpressure of air so that it is substantially the same as a similarly varying pressure of ink. The ink pressure at the outer portion of gap 22 decreases in proportion to flow of ink through the gap which flow is regulated to exert a force on the orifice band to effect vertical alignment of the orifices 15.

The vertical alignment of the orifice band to center the orifices on the piezoelectric transducer 42 and charging electrodes not shown is attained by a servosystem which detects a deviation from alignment and exerts a restoring force to null the deviation. The particular servosystem shown in the drawing comprises an orifice band pneumatic position sensor 51 connected to pneumatically operated regulator valves 54 and 55. The position sensor 51 also connects to a compressed air source 56 and is connected through constriction 57 to nozzle 58. A vent channel 60 connects to vent 61 at atmospheric pressure to isolate the position sensor 51 from air which otherwise would flow under pressure from air channel 62. A compressed air source 63 is connected to regulator valve 54 and an ink receiver 65 is connected to regulator valve 55. Pressure within the pneumatic sensor 51 communicates with pneumatic operator 67 which connects to the regulator valves 54 and 55 which operate together so that the air pressure in the air channel is substantially the same as ink in ink return channel 69 with a slight bias toward higher air pressure to preclude leakage of ink beyond the ink channel. When the orifice band 10 is in an aligned null error position as shown, the regulator valve is adjusted so that ink flows through the gap 22 at a sufficient velocity to exert an upward force on the orifice band which is equal to its weight and any other downward forces. At the same time, regulator valve 54 is adjusted to develop sufficient air pressure in channel 62 so that ink does not flow above the ink return channel 69.

When the orifice band 10 drifts upward, impedance at nozzle 58 increases, air pressure within the position sensor 51 increases, and pneumatic operator 67 partly closes regulator valve 55 to reduce ink flow through gap 22. At the same time, the pneumatic operator 67 partly opens the regulator valve 54 to increase air pressure thereby compensating for the reduced pressure drop of ink in the gap. When the orifice band 10 moves downward, air pressure within the pressure sensor 51 decreases, the pneumatic operator partly closes the regulator valve 55 to increase flow of ink through the gap 22, and the pneumatic operator partly opens the regulator valve 54 to decrease air pressure to compensate for an increased pressure drop of ink flowing through the gap.

I claim:

1. Apparatus for confining a liquid within a gap, said liquid being under a pressure substantially different from atmospheric, comprising:

- means for constraining a first surface which is movable with respect to a second surface to maintain a gap therebetween,
- a source of a liquid under pressure communicating with the gap,
- a source of a gas and means for regulating the gas at substantially the pressure of the liquid, and
- an enclosure sufficiently proximate to the movable first surface so that the gas surrounding the gap is maintained at the regulated pressure whereby the pressure differential across the gap is substantially null and the liquid is substantially confined within the gap.

2. The apparatus of claim 1 wherein the first surface is planar and the second surface and the enclosure are on the same side of the planar first surface.

3. The apparatus of claim 2 further comprising an air bearing rigidly connected to oppose and to be separated from the second surface and the enclosure and wherein the first planar surface is a band positioned between the air bearing on one side and the second surface and enclosure on the other side, said air bearing thereby constraining the band to maintain the gap.

4. An ink source assembly with regulated flow of ink through a gap, comprising:

- means for constraining an endless orifice band in a path and means for traversing the orifice band along the path,
- an ink source channel on one side of the orifice band and separated therefrom by a gap,
- means for delivering liquid ink at a pressure to the ink source channel whereby the ink tends to flow into the gap,
- a first air channel adjacent to the gap and substantially parallel to the ink source channel, and
- means for regulating pressure of air in the first air channel thereby regulating pressure differential between the ink source channel and the first air channel so that flow of the ink from the ink source channel to the first air channel is regulated to attain a limited leakage of ink through the gap.

5. The ink source assembly of claim 4 wherein the pressure of air in the first air channel is substantially the same as the pressure of the ink in the ink source channel whereby the ink is substantially confined to the gap.

6. The ink source assembly of claim 4 wherein pressure of air in the first air channel is slightly less than the pressure of the ink in the ink source channel whereby a small amount of ink flows from the gap to preclude entry of air thereinto and further comprising a second air channel and means for regulating pressure of air in the second air channel at a slightly higher pressure than the pressure of the ink in the ink source channel whereby the ink does not flow beyond the second air channel.

7. The ink source assembly of claim 4 wherein the flow of ink in the gap is regulated for alignment of the orifice band, further comprising:

- an ink return channel between the first air channel and the ink source channel, and
- means for regulating flow of the ink from the ink source channel to the ink return channel through the gap whereby a regulated fluid friction force is exerted on the orifice band and the means for regulating air pressure in the first air channel provides confinement of the ink to the gap.

8. The ink source assembly of claims 4, 5, 6 or 7 wherein the means for constraining the orifice band comprises an air bearing on one side of the orifice band and having opposed thereto on the other side of the orifice band the ink and air channels.

9. A process for reducing leakage of ink from a gap between orifice band and an ink source in an ink jet printer, comprising the steps of:

applying a pressure to the ink in the ink source whereby the pressure causes the ink to enter the gap, surrounding the gap with a gas, said gas being sufficiently enclosed around the gap to enable regulation of the pressure of said gas, and regulating pressure of the gas to be substantially the same as the pressure of the ink whereby the ink is substantially confined to the gap.

10. The process of claim 9 wherein the gas is in a first air channel and the pressure of the gas is slightly less than the pressure of the ink in the gap whereby the gas is precluded for entering the gap, and comprising the further steps of:

surrounding the gas in the first air channel by a gas in a second air channel, and regulating gas pressure in the second air channel to be slightly higher than the pressure of the gas in the first air channel whereby some ink may flow into the first air channel but not to the second air channel.

11. The process of claims 9 or 10 wherein flow of the ink through the gap is regulated to exert a force on the orifice band for alignment thereof, comprising the further steps of:

regulating the pressure of ink in an ink return channel whereby flow of ink through the gap is regulated, and regulating the pressure of the gas surrounding the gap so that the pressure of the gap is substantially the same as the pressure of ink entering the ink return channel as the ink leaves the gap.

* * * * *